United States Patent [19]

Miller

[11] 4,219,842

[45] Aug. 26, 1980

[54] VIDEO SIGNAL COMBINER HAVING A COMMON PHASE RESPONSE AND INDEPENDENT AMPLITUDE RESPONSE

[75] Inventor: William G. Miller, Fort Wayne, Ind.

[73] Assignee: The Magnavox Company, Fort Wayne, Ind.

[21] Appl. No.: 936,446

[22] Filed: Aug. 24, 1978

[51] Int. Cl.² .............................................. H04N 9/535
[52] U.S. Cl. ..................................... 358/31; 358/21 R
[58] Field of Search ..................................... 358/31, 21

[56] References Cited

U.S. PATENT DOCUMENTS

| | | | |
|---|---|---|---|
| 3,728,476 | 4/1973 | Bates et al. | 358/31 |
| 3,938,179 | 2/1976 | Amery | 358/31 |

*Primary Examiner*—Richard Murray
*Attorney, Agent, or Firm*—Thomas A. Briody; William J. Streeter

[57] ABSTRACT

Apparatus is described for providing two signal paths which have a common phase response but dissimilar amplitude responses. Two signals applied to the circuit input terminals are independently filtered in amplitude. The two resulting filtered signals are combined preserving the relative phase difference between signals.

4 Claims, 6 Drawing Figures

VIDEO SIGNAL COMBINER HAVING A COMMON PHASE RESPONSE AND INDEPENDENT AMPLITUDE RESPONSE

BACKGROUND OF THE INVENTION

This invention relates to the video signal processing art. Specifically, apparatus is described for supplying two signal paths for filtering at least one of the signals without disturbing the relative phase relationship with another signal in a second signal path.

Video signal processing may require two or more signals to be amplitude filtered to different degrees while preserving the relative phase relationship between signals. After filtering is completed, the signals are combined. However, the phase of the signals combined is maintained in the same relationship as exists between the unfiltered signals.

An example of such a requirement can be found in the comb filter art as applied to television signal processing. Comb filters require that a video signal be delayed for a period of 1/Fh seconds where Fh is the horizontal scanning frequency. The delayed signal is combined with an undelayed video signal whereby a chroma signal is produced. The chroma signal is subtracted from an undelayed video signal to yield the luminance portion of the video signal.

Limitations in delay line bandwidth have made advantageous further filtering of the chroma signal before combining with the video signal to produce a luminance signal. Most of the chroma signal is located near 3.58 mHz and therefore, using a bandpass filter to further filter the chroma signal provides for mostly chroma signal which when subtractively combined with the video signal produces a substantially chroma free luminance signal.

This technique, however, requires that phase compensation be introduced into the undelayed video signal to compensate for a phase delay experienced by the chroma signal during bandpass filtering. The phase compensation delays the unfiltered video signal to the same degree, and over the same bandwidth, that the bandpass filtered signal is delayed. Phase matching two independent signal paths becomes very difficult over any appreciable bandwidth. Therefore, it is desirable to construct a network having two signal paths with common phase determining elements but having independent amplitude vs. frequency responses, the first path being a substantially all pass network and the second path having a bandpass filter structure. The signals produced by both signal paths are maintained in a fixed phase relationship but have a different amplitude relationship.

SUMMARY OF THE INVENTION

It is a principal object of this invention to provide an electronic circuit for keeping two signals in a fixed phase relationship while one of the signals is being amplitude filtered.

These and other objects are accomplished by the apparatus of the invention. A first and second signal path are provided for receiving two signals. The first signal is applied to a signal path comprising a filter having at least two sections, each section having an identical frequency response. The output of the filter is applied to an input of a signal combiner. A second signal path is provided which couples a portion of the second signal to each input of the signal combiner.

The filter is structured so that the first filter section which receives the first signal does not contribute to the impedance seen at the signal combiner input. In this manner the phase response of the two signal paths is equivalent.

DESCRIPTION OF THE PREFERRED EMBODIMENT

Figure 1:
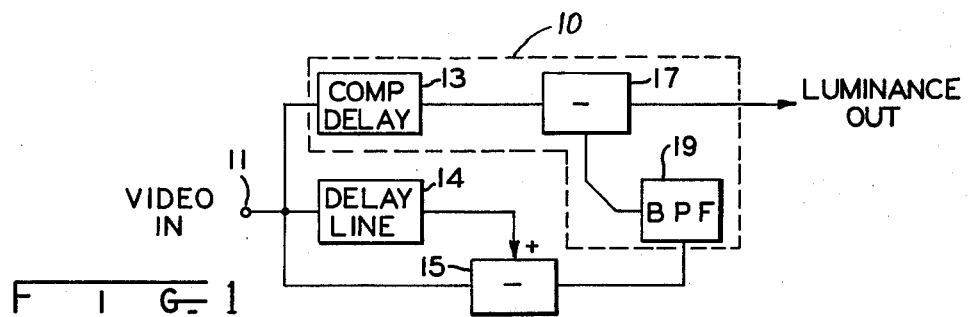
FIG. 1 shows a preferred use of an embodiment of the invention.

Referring now to FIG. 1, there is shown the use of one embodiment 10 of the present invention in a known comb filter circuit. Terminal 11 receives a standard interleaved NTSC video signal containing both a luminance and chroma signal. A delay line 14 delays the video signal 1/Fh seconds. The delayed signal is subtracted from the undelayed signal present at terminal 11 by a subtractor network 15 to produce a signal which is substantially the chroma portion of the video signal. Subtracting the chroma signal produced by the subtractor circuit 15 from the input video signal produces the luminance signal. It is, however, desirable to bandpass filter the chroma signal about the 3.58 mHz region of the video signal spectrum before subtracting from the input video signal as most of the chroma signal is centered about 3.58 mHz. A bandpass filter 19 is included to provide this filtering. The bandpass filter 19, however, delays the chroma signal which requires that the input video signal to which it is combined be delayed an equivalent amount. Delay compensation network 13 provides this additional delay. Signal combiner 17 subtractively combines the delayed video signal with the chroma signal to produce a luminance signal.

Figure 2:
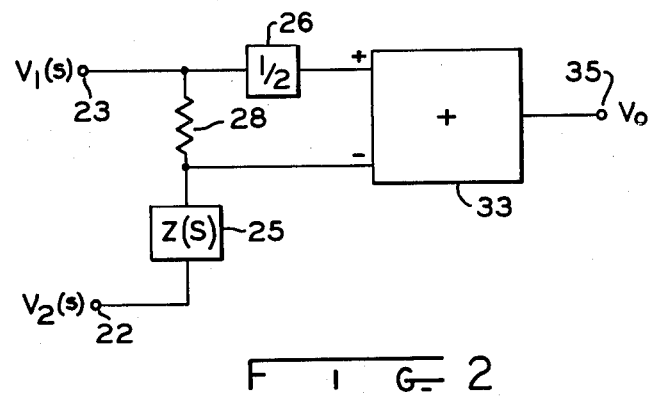
FIG. 2 is a schematic of a circuit for combining two signal paths which have different amplitude responses.

Referring now to FIG. 2, there is shown a circuit which illustrates a circuit for combining two signals. Two signals V1(s) and V2(s) are applied to two distinct signal paths. The first signal path is connected to terminal 23. An amplitude scaler 26 supplies $\frac{1}{2}$ V1(s) to signal combiner 33. A portion of the signal V1(s) enters a second input of signal combiner 33. The second signal path is terminated by terminal 22. An imaginary impedance 25 couples the signal V2(s) to the second input of signal combiner 33. The respective signal paths have common phase determining elements. Imaginary impedance 25 may be selected to be a filter structure whereby V2(s) is filtered altering the amplitude and phase versus frequency characteristics of the signal V2(s).

The network of FIG. 2 may be analyzed with respect to the signal paths for signals V1(s) and V2(s). The signal V0 at terminal 35 due to V1(s) is as follows:

$$V0(s) = \tfrac{1}{2} \cdot V1(s) - \left[\frac{V1(s)\, Z(s)25}{R28 + Z(s)25}\right] =$$

$$\tfrac{1}{2}\left[\frac{R28 - Z(s)25}{R28 + Z(s)25}\right] V1(s)$$

The signal provided at V0(s) by the signal V2(s) is calculated as follows:

$$V0(s) = \frac{-V2(s)\, R28}{R28 + Z(s)25}$$

Figure 3A:
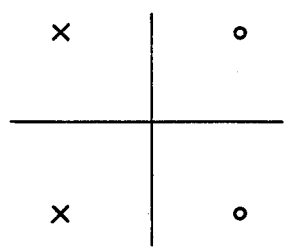
FIG. 3a is an S plane representation of the complex frequency response of the circuit of FIG. 2 with respect to a signal supplied to terminal 22.
Figure 3B:
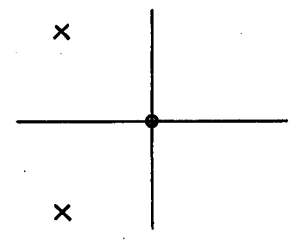
FIG. 3b is an S plane representation of the complex frequency response of the circuit of FIG. 2 with respect to a signal supplied to terminal 23.

The S plane representations for the transfer functions of the respective signal paths are shown in FIGS. 3a and 3b. FIG. 3a illustrating the transfer function of V0(s)/V1(s) has two poles and two zeroes which correspond with the phase and amplitude response of the signal path which receives V1(s). FIG. 3b illustrating the transfer function V0(s)/V2(s) has a zero at the origin and two poles which are located in the same position as the poles provided by the signal path defined by V0(s)/V1(s).

To make the phase response of the signal paths defined by V0(s)/V1(s) and V0(s)/V2(s) equivalent, two additional poles are added to the signal path V0(s)/V2(s).

Figure 4:
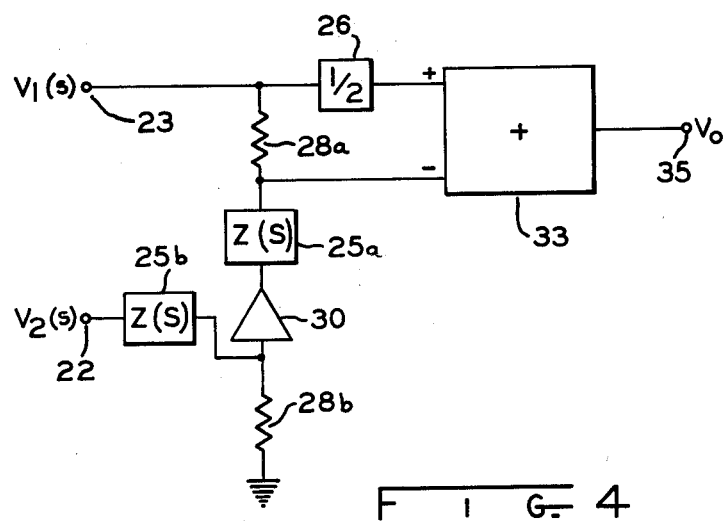
FIG. 4 is a schematic diagram of an embodiment of the invention.

Referring now to FIG. 4, there is shown an embodiment of the present invention synthesized from the network of FIG. 2. The phase response of the signal path from terminal 23 to terminal 35 and the signal path from terminal 22 to terminal 35 are identical. The transfer functions for these signal paths are defined by the following:

$$\frac{V0(s)}{V2(s)} = \frac{R28a}{Z(s)25a + R28a} \cdot \frac{R28b}{Z(s)25b + R28b}$$

Where R28a is the resistance of resistor 28a, R28b is the resistance of resistor 28b, Z(s)25a is the impedance of imaginary impedance 25a, and Z(s)25b is the impedance of imaginary impedance 25b. This structure may be realized by using a filter having two sections which are identical in frequency response.

The phase responses of the two signal paths V0(s)/V2(s) and V0(s)/V1(s) are identical whereas the amplitude responses of the signal paths are independent. The signal paths are combined by a differential amplifier 33 and applied to terminal 35. If R28a=R28b and Z(s)25a=Z(s)25b, the output signal may be defined as:

$$V0(s) = \frac{R28^2 a}{(Z(s)25a + R28a)^2} V2(s) + \tfrac{1}{2}\left[\frac{R28a - Z(s)25a}{R28a + Z(s)25a}\right] V1(s)$$

The identical phase response for each signal path results from the effect of buffer amplifier 30. Impedance 25b and resistor 28b do not contribute to the phase response of signal path V0(s)/V1(s) as they are isolated from the signal path by buffer amplifier 30. It will be recognized by those skilled in the art that a number of equivalent networks could be substituted for the network comprising resistor 28b and impedance 25b.

Figure 5:
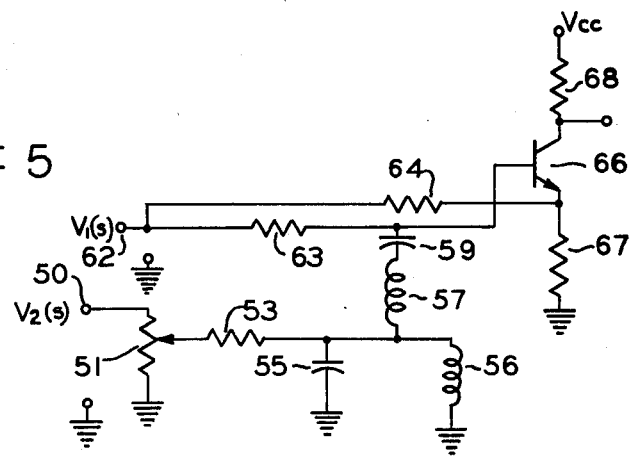
FIG. 5 is a schematic diagram of a preferred embodiment of the invention.

Another embodiment of the invention is shown in FIG. 5. The embodiment shown will provide bandpass filtering to a signal applied to terminal 50 and all-pass filtering to a signal applied to terminal 62 whereby the amplitude of the signal with respect to frequency is not altered. Transistor 66, resistor 68, and resistor 67 form an amplifier circuit which can combine two signals. The signal entering terminal 62 is divided by $\tfrac{1}{2}$ by equal valued resistors 64 and 67 and applied through the equivalent parallel resistance of R64 and R67 to the emitter of transistor 66.

Resistor 63 also supplies the signal to the base of transistor 66. Those skilled in the art will recognize that the collector of transistor 66 will provide a signal which is proportional to the differential voltage between the base and $\tfrac{1}{2}$ the signal entering terminal 62.

A second signal V2(s) is applied to terminal 50 where it is divided by potentiometer 51. Potentiometer 51 will provide for amplitude balancing of input signal V2(s) with the signal V1(s) supplied to terminal 62.

The network which comprises resistor 53, capacitor 55, inductor 56, inductor 57, and capacitor 59 provides a second signal path which alters the amplitude versus frequency characteristics of the signal entering terminal 50. Elements 57 and 59 form a series resonant circuit. Inductor 56 and capacitor 55 form a parallel resonant circuit. The combination of the two resonant circuits and resistor 53 corresponds to imaginary impedances 25a, 25b and resistor 28b of FIG. 4.

A buffer amplifier is not included between the parallel resonant circuit formed by capacitor 55 and inductor 56 and the series resonant circuit formed by inductor 57 and capacitor 59. This is accomplished by making the combination of the parallel resonant circuit, resistor 53 and potentiometer 51 a low impedance circuit. The low impedance circuit affects the phase response of signal path V0(s)/V1(s) minimally.

The output signal provided by the collector of transistor 66 comprises the subtractively combined filtered signal V2(s) and V1(s). The circuit shown has been used in the comb filter circuit of FIG. 1. The filter structure in the signal path which receives V2(s) provides a center frequency of substantially 3.58 mHz.

Thus there is described a network for combining two signals one of which is filtered, the combined signal components having the same phase relationship as the two input signals.

What is claimed is:

1. A circuit for filtering a first signal and combining said signal with a second unfiltered signal comprising:
    (a) a first terminal for receiving said unfiltered signal;
    (b) a transistor amplifier having a base terminal, a first emitter terminal connected to one end of an emitter resistor, a collector terminal connected to one end of a collector resistor, the remaining ends of said resistors being adapted to receive a d.c. voltage;
    (c) a coupling resistor for connecting said first terminal to said base terminal;
    (d) a resistor for connecting said first terminal to said emitter terminal;
    (e) a two-section bandpass filter connected to said transistor amplifier for receiving said first signal and supplying a filtered signal to said transistor base terminal, the phase of the unfiltered signal being altered by one section of said two-section bandpass filter, whereby said transistor amplifier will amplify the combination of said filtered and said unfiltered signal and maintaining the same relative phase relationship between said combining signals as said first and second signals.

2. A circuit for producing a composite signal from two related signals comprising:
   (a) a first signal path comprising a bandpass filter adapted to receive a first signal;
   (b) a second signal path comprising first and second resistors having a common end, said end adapted to receive a second signal;
   (c) a common emitter transistor amplifier having a transistor, an emitter resistor having one end connected to said transistor emitter and to the remaining end of said first resistor, a collector resistor connected to the collector terminal of said transistor, said transistor base terminal being connected to said second resistor free end and to the output of said bandpass filter, said collector resistor and emitter resistor free ends being adapted to receive a d.c. voltage whereby said transistor collector will produce a signal which is the composite of the signals provided by said first and second signal paths.

3. An apparatus for combining two video signals comprising:
   (a) a first terminal for receiving a first video signal V1(s);
   (b) combining means having a first and second input; said means producing a signal proportional to the difference of the signals at said inputs;
   (c) a means for applying a portion of the signal appearing at said first terminal to said first input;
   (d) a resistor connected between said first input terminal and said second input;
   (e) a second input terminal for receiving a second video signal V2(s);
   (f) a filter structure having at least two sections, each section having an identical frequency response, connected between said second terminal and said second input whereby a filtered signal is produced at the output of said combining means which is the combination of an amplitude filtered signal and a portion of the said first input signal.

4. An apparatus for combining two video signals comprising:
   (a) a first terminal for receiving a first video signal;
   (b) a second terminal for receiving a second video signal;
   (c) combining means having a first and second input, said means producing a signal proportional to the difference of the signals at said inputs;
   (d) means for splitting a signal at said first terminal into two signals, each of said signals being applied to said inputs;
   (e) a filter structure having first and second sections, said first section being connected to said second terminal, said second section being connected to said second input, said sections having equivalent frequency responses, said second section being isolated from said first section whereby the impedance at said second input is not influenced by said first section.

* * * * *